US011869267B2

(12) United States Patent
Deng et al.

(10) Patent No.: US 11,869,267 B2
(45) Date of Patent: Jan. 9, 2024

(54) THIN, MULTI-LENS, OPTICAL FINGERPRINT SENSOR ADAPTED TO IMAGE THROUGH CELL PHONE DISPLAYS

(71) Applicant: OmniVision Technologies, Inc., Santa Clara, CA (US)

(72) Inventors: Jau-Jan Deng, Taipei (TW); Kuang-Ju Wang, Taipei (TW); Chun-Jen Wei, Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 70 days.

(21) Appl. No.: 17/512,106

(22) Filed: Oct. 27, 2021

(65) Prior Publication Data

US 2023/0131591 A1    Apr. 27, 2023

(51) Int. Cl.
| | |
|---|---|
| *G06K 9/00* | (2022.01) |
| *G06K 9/46* | (2006.01) |
| *G02B 3/00* | (2006.01) |
| *G02B 5/00* | (2006.01) |
| *G02B 5/20* | (2006.01) |

(Continued)

(52) U.S. Cl.
CPC ....... *G06V 40/1318* (2022.01); *G02B 3/0037* (2013.01); *G02B 5/003* (2013.01); *G02B 5/208* (2013.01); *G06V 10/40* (2022.01); *G06V 40/1335* (2022.01); *G06V 40/1365* (2022.01)

(58) Field of Classification Search
CPC .......... G06V 40/1318; G06V 40/1365; G06V 10/40; G06V 40/1335; G02B 3/0037; G02B 5/004; G02B 5/208
See application file for complete search history.

(56) References Cited

U.S. PATENT DOCUMENTS

| | | |
|---|---|---|
| 2018/0012069 A1 | 1/2018 | Chung et al. |
| 2019/0179488 A1 | 6/2019 | Klenkler et al. |

(Continued)

FOREIGN PATENT DOCUMENTS

| | | | | |
|---|---|---|---|---|
| CN | 102472837 B | * | 2/2015 | ....... B29D 11/00009 |
| EP | 3420881 A1 | * | 1/2019 | ......... A61B 1/00096 |
| KR | 2134298 B1 | * | 7/2020 | |

OTHER PUBLICATIONS

Translation of CN-102472837-B (Year: 2015).*
Translation of KR-2134298-B1 (Year: 2020).*

*Primary Examiner* — Lixi C Simpson
(74) *Attorney, Agent, or Firm* — COZEN O'CONNOR (57) ABSTRACT

A multiple-lens optical fingerprint reader for reading fingerprints through a display has a spacer; and multiple microlenses with concave and convex surfaces in a microlens array, each microlens of multiple lenses focuses light arriving at that microlens from a finger adjacent the display through the spacer forms an image on associated photosensors on a photosensor array of an image sensor integrated circuit. A method of verifying identity of a user includes illuminating a finger of the user with an OLED display; focusing light from the finger through arrayed microlenses onto a photosensor array, reading the array into overlapping electronic fingerprint images; extracting features from the overlapping fingerprint images or from a stitched fingerprint image, and comparing the features to features of at least one user in a library of features and associated with one or more fingers of one or more authorized users.

11 Claims, 9 Drawing Sheets

(51) Int. Cl.
*G06V 40/13* (2022.01)
*G06V 10/40* (2022.01)
*G06V 40/12* (2022.01)

(56) References Cited

U.S. PATENT DOCUMENTS

| | | | |
|---|---|---|---|
| 2021/0042494 A1* | 2/2021 | Xie | G06V 40/1318 |
| 2021/0334500 A1* | 10/2021 | Huang | H01L 27/156 |
| 2021/0342565 A1 | 11/2021 | Fan | |
| 2021/0360154 A1* | 11/2021 | Slobodin | H04N 23/90 |

* cited by examiner

THIN, MULTI-LENS, OPTICAL FINGERPRINT SENSOR ADAPTED TO IMAGE THROUGH CELL PHONE DISPLAYS

BACKGROUND

Many modern cell phone operating systems, including Apple iOS and Android, are configurable to use biometrics, such as fingerprints, as an alternative to user entry of unlock codes to validate user identity. A prior optical sensor for reading fingerprints used an electronic camera equipped with a single lens and an image sensor with a single array of photosensors to image a fingerprint surface of a finger through an OLED cell-phone display. To image a reasonable area of the finger, the lens and array of photosensors were large and required considerable space between lens and the array of photosensors—posing issues in the limited space available in a cell phone.

SUMMARY

In an embodiment, a multiple-lens optical fingerprint reader adaptable to read fingerprints through a display includes an image sensor integrated circuit with at least one photosensor array; a spacer; and multiple microlenses organized in a microlens array, each microlens of the microlenses configured to focus light arriving at that microlens from a portion of a fingerprint region of a finger adjacent a surface of the display to form an image on a plurality of photosensors associated with that microlens, the photosensors being of a photosensor array of at least one photosensor array in the image sensor integrated circuit. The microlenses each include a concave element on a first side of a transparent substrate and a convex element on a second side of the transparent substrate. In a particular embodiment, for microlenses adjacent an edge of the microlens array, the portion of the fingerprint region from which light is focused onto the plurality of photosensors by each microlens is offset in a direction away from a center of the microlens array from the image formed on the plurality of photosensors associated with that microlens.

In an embodiment, a method of verifying identity of a user includes illuminating a fingerprint region of a finger of the user with an organic light emitting diode (OLED) display panel; focusing light from the fingerprint region through an array of microlenses onto at least one photosensor array of an integrated circuit, each microlens focusing light from a portion of the fingerprint region onto multiple photosensors of the at least one photosensor arrays; reading the at least one photosensor array to form overlapping electronic fingerprint images; extracting features by a method selected from extracting features from the overlapping electronic fingerprint images and extracting features from a stitched image formed from the overlapping electronic fingerprint images; and comparing the features to features of at least one user in a library of features associated with one or more fingers of one or more authorized users in a memory. The microlenses each include a concave element on a first side of a transparent substrate and a convex element on a second side of the transparent substrate. In a particular embodiment, the microlenses of the microlens array and photosensor arrays of the integrated circuit are configured so the portion of the fingerprint region from which light is focused onto the plurality of photosensors by each microlens at edges of the microlens array is offset in a direction away from a center of the microlens array.

A method of making a fingerprint reader includes forming an infrared filter on a bottom side of a thin glass substrate; depositing a light-absorbing coating on the infrared filter; masking and etching the light-absorbing coating to form openings; forming an array of concave microlens elements on the thin glass substrate by reflowing reflowable optical material onto a top side of the thin glass substrate and shaping the reflowable optical material with a first preformed wafer-sized stamp; forming an array of convex microlens elements on the thin glass substrate by reflowing reflowable optical material onto a bottom side of the thin glass substrate and shaping the reflowable material with a second preformed wafer-sized stamp; aligning, and bonding the thin glass substrate to a spacer to form a microlens panel; aligning and bonding the microlens panel to a wafer of integrated circuits, each of the integrated circuits having at least one array of photosensors; dicing the wafer of integrated circuits; and bonding the integrated circuits to a flexible printed circuit.

DETAILED DESCRIPTION OF THE EMBODIMENTS

Figure 1:
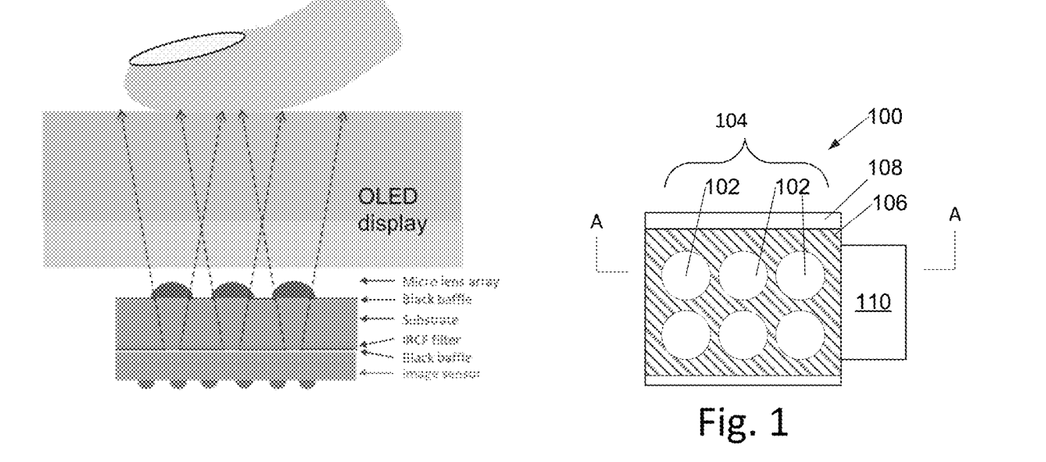
FIG. 1 is a top view of an optical fingerprint sensor module configured for placement beneath an OLED cell phone display and having a 2×3 array of microlenses and a spacer atop an image sensor, and a circuit board.

A fingerprint sensor module 100 (FIG. 1) has a microlens array 104 of microlenses 102, in this example a 2×3 array. In other examples, it is anticipated that the microlens array may have other numbers of lenses, such a 3×3, 3×6, 4×4, 4×8, 5×5, 6×6, 6×8, 6×10, or larger lens array. The microlenses 102 of the microlens array 104 are surrounded by a black mask 106. The microlens array 104 and black mask 106 are mounted atop a transparent spacer (208 in FIG. 2) mounted atop an image sensor integrated circuit 108 that may in some embodiments also include other functions such as processor and memory functions. The image sensor integrated circuit 108 may in some embodiments be mounted directly to a processor printed circuit board of a cell phone or other fingerprint-activated unit, or in other embodiment be mounted to a flexible printed circuit 110 that extends beyond integrated circuit 108 so it may be coupled to a connector, such as connector 202 (FIG. 2) attached to a processor printed circuit board 204 of a cell phone or other fingerprint-activated or fingerprint-detecting unit. Fingerprint sensor module 100, 206 has the flexible printed circuit 110 that may couple through connector 202 to other components of the phone.

Figure 2:
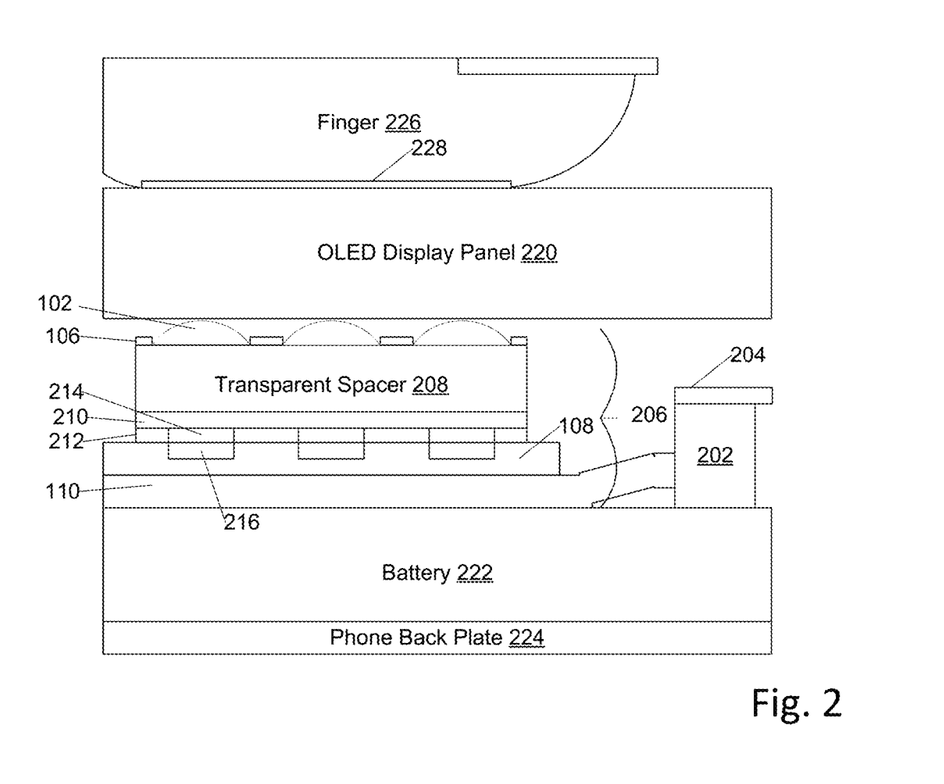
FIG. 2 is a cross-sectional diagram of a finger, OLED display, the optical fingerprint sensor module of FIG. 1 taken along line A-A in FIG. 1, and a battery; the optical fingerprint sensor module having a microlens array, spacer, image sensor, and a flexible circuit board.

Under the spacer 208, in wavelength selective embodiments, there may be an infrared cut or pass filter 210, which is omitted in other embodiments. There is also an opaque, black, mask 212 with openings 214 that align with photosensor arrays 216 of integrated circuit 108

In a typical application, the fingerprint sensor module 100 is positioned under an organic light-emitting diode (OLED) display panel 220 of the cell phone, the OLED display panel 220 being of a known thickness and at least semitransparent to light at infrared wavelengths if an infrared pass filter 210 is present, or semitransparent to some visible light wavelengths if infrared cut filter 210 is present.

The fingerprint sensor module 100 is also typically positioned in front of a battery 222 that is positioned in front of a back plate 224 of the cell phone, the distance from a back side of back plate 224 to a front side of the OLED display panel 220 defining thickness of the cell phone.

When a finger 226 of a user is positioned in contact with the front of the OLED display panel 220, some light reflected from a fingerprint region 228 of the finger 226 passes through OLED display panel 220 and is focused by microlenses 102 onto photosensor arrays 216.

In an embodiment, each microlens 102 of the lens array as an aspheric single-element lens with total optical track length (TTL), measured as a distance from a front surface of the lens to the photosensor array 216 of integrated circuit 108 of between 1.5 mm and 2.1 mm, Fstop of 1.0 to about 1.5, a wide field of view FOV=123°, and an effective focal length EFFL=0.113 mm. Each lens is 0.09935 mm in diameter and 0.0526 mm tall. In embodiments, the lens is defined such that the radius of the front lens surface R1 divided by the effective focal length lies between 0.44 and 0.61, stated as 0.44<R1 (radius of lens surface)/EFFL<0.61. Further, R2 (R2 being a radius of curvature of the concave rear surface) divided by R1 (R1 being a radius of curvature of the convex surface) is greater than 10, and in a particular embodiment is greater than 15. In embodiments, R1 is less than 0.5 mm, and the thickness between the two optical surfaces divided by the effective focal length lies between 0.4 and 0.9 (0.4<lens, while lens thickness (a distance between the two optical surfaces) divided by EFFL (EFFL is an effective focal length of the microlens) is less than 0.9.

Figure 3:
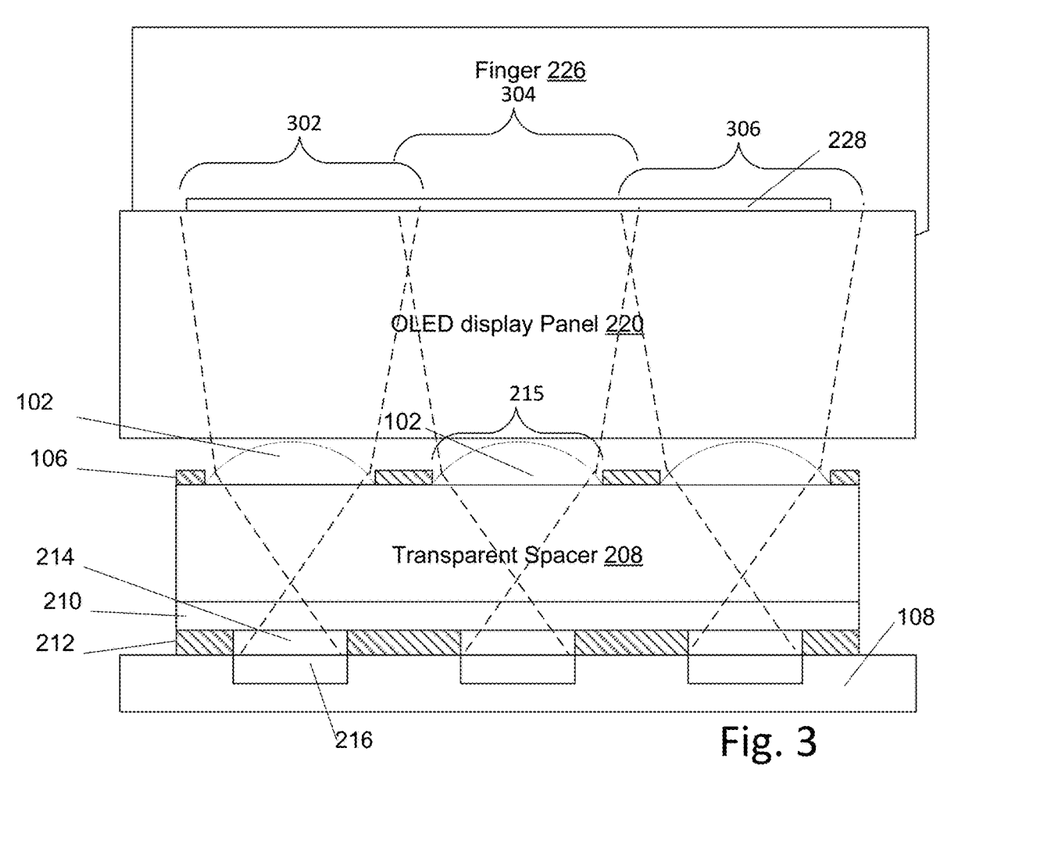
FIG. 3 is an enlarged copy of a portion of FIG. 2, showing overlapping fields of view of image sensor photodiode arrays with traced light paths.

As illustrated in FIG. 3, each microlens 102 of the microlens array 104 images a portion 302, 304, 306 of the fingerprint region 228 of finger 226 and produces an image on a separate photosensor array 216 of integrated circuit 108 of that portion of the fingerprint region. In an embodiment, the portion 302, 304, 306 of the fingerprint region 228 of finger 226 that each lens images onto the photosensor array 216 is centered directly above, but is larger than, the photosensor array; this is termed on-axis imaging. In an embodiment, each photosensor array typically is at least a 100×100 array of photosensors. In an alternative embodiment, all the lenses project images onto a single array of at least 400×400 photosensors, where the lenses of the lens array each project its image onto a separate area of the single array of photosensors.

Figure 4:
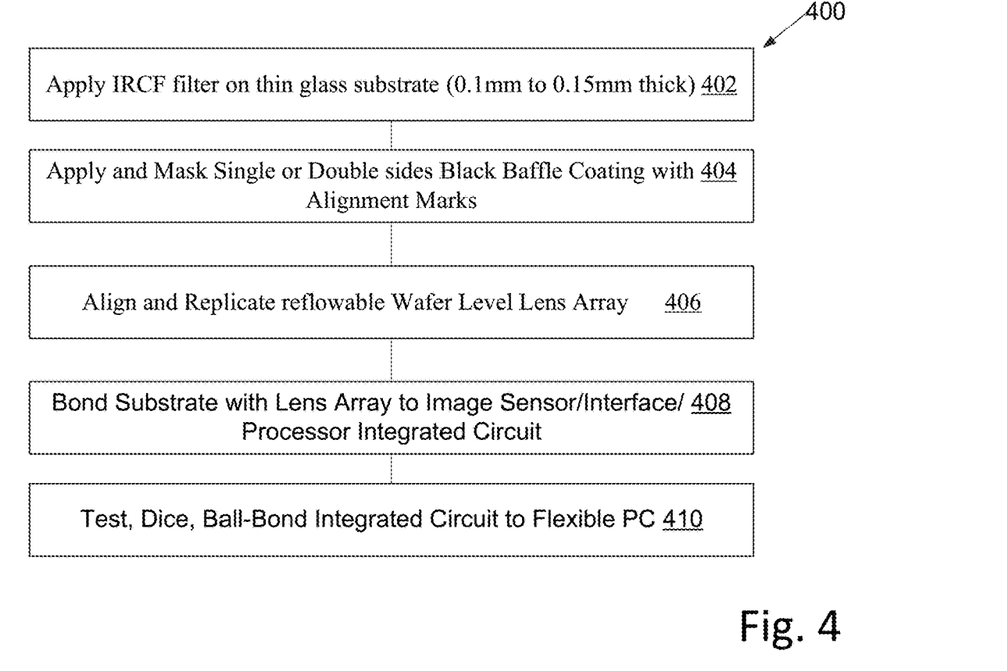
FIG. 4 is a flowchart illustrating a method for fabrication of the optical fingerprint sensor.

The fingerprint sensor module 100 is produced by a process 400 according to FIG. 4. The infrared filter 210 is deposited 402 on a bottom side of a thin glass substrate that will become spacer 208 of between 100 um and 150 um thickness (inclusive). Black light-absorbing coatings, or masks, 212 are then deposited 404 on the bottom side of the glass substrate 208, if the infrared filter 210 is present the light-absorbing coating 212 is deposited over the infrared filter 210. In some embodiments black mask 106 is also deposited on a top side of the glass substrate or spacer 208. The bottom black light absorbing coating 212, and black mask 106 if used, are then masked and etched to form openings 214, 215 and alignment marks (not shown), these black coatings form baffles that improve image quality when lenses are formed with small pitch and large image overlap areas.

The microlens array 104 is formed 406 as a wafer level lens array by reflowing reflowable optical material onto a top side of the glass substrate or spacer 208 and the reflowable optical material is shaped with a preformed wafer-sized stamp. The alignment marks are used to align the stamp and optical material with the previously formed openings 214, 215 in the light absorbing coating. The bottom side of the glass substrate or spacer 208 with light absorbing coating 212 is then aligned, and bonded 408, to a wafer of integrated circuits 108. The assembled wafer with microlenses 102, glass substrate serving a spacer 208, and integrated circuits 108 may be tested and defective circuits inked. The assembled wafer is then diced, typically by sawing, and individual microlens array 104, substrate or spacer 208, black mask106, 212, and integrated circuit 108 assemblies bonded 410 using a ball-bond reflow technique to flexible printed circuit 110.

Figure 6:
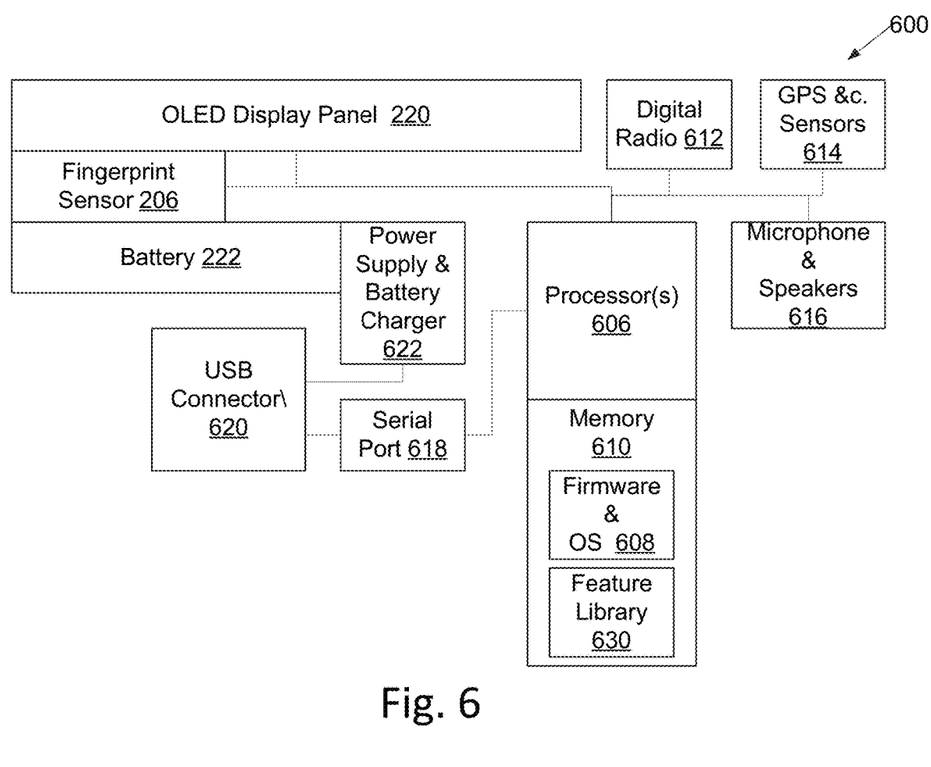
FIG. 6 is a block diagram illustrating a cellular telephone device in which the optical fingerprint sensor may be used.

The fingerprint sensor module 100, 206 is used in a cellular telephone 600 (FIG. 6); the cellular telephone 600 incorporates OLED display panel 220, typically having touch sensing capability, operable under control by one or more processors 606 coupled to receive raw images or extracted features from fingerprint sensor 206. On or more processors 606 operate under control of firmware and an operating system 608 in a memory system 610, and are also coupled to one or more digital radios 612 configured for two-way communications with at least digital cellular towers. The processors 606 are also coupled to a global positioning system receiver and other sensors 614 such as accelerometers, a microphone and speaker 616, and in many embodiments a serial port 618 coupled to a universal serial bus (USB) interface 620. Cellular telephone 600 is powered by the battery 222, through a power supply circuit and recharged by a charger 622.

Figure 5:
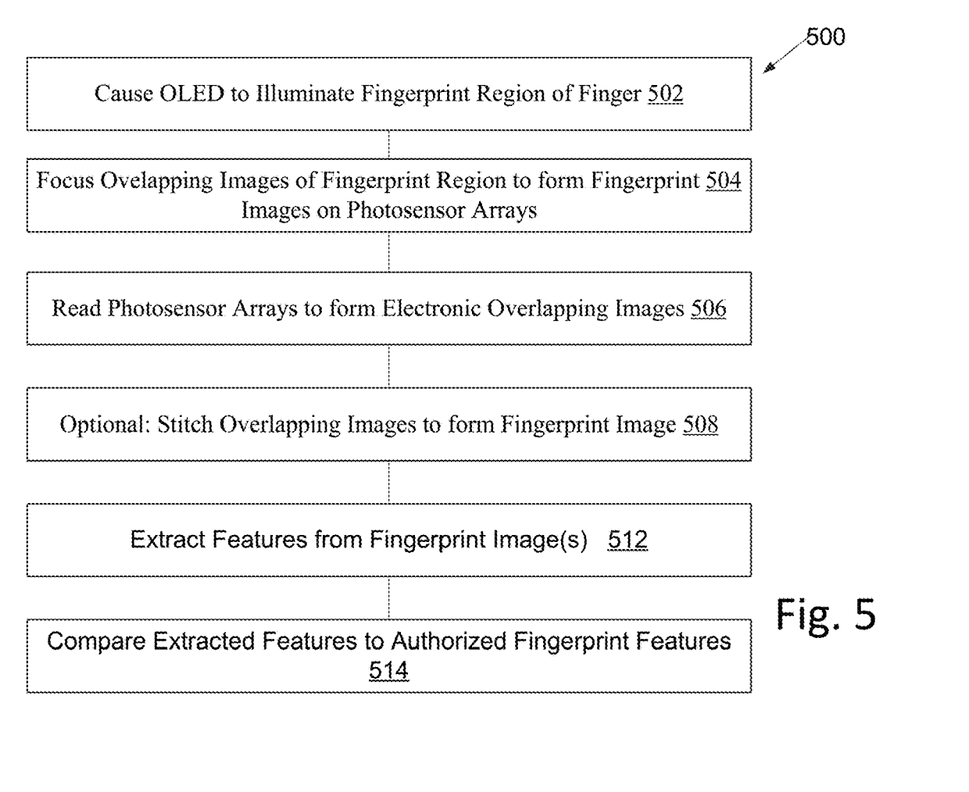
FIG. 5 is a flowchart illustrating a method for how the optical fingerprint sensor is used.

The fingerprint sensor is operated by a method 500 (FIG. 5) including illuminating 502 the fingerprint region 118 of the finger 226 using the OLED display panel 220; light from the fingerprint region 228 is focused by microlenses 102 onto the photosensor arrays 216 of integrated circuit 108, each microlens 102 focuses light onto multiple photosensors of the photosensor arrays. The photosensor arrays are then read 506 to form overlapping electronic fingerprint images. The overlapping electronic fingerprint images may in some embodiments then be stitched 508 to form a single electronic fingerprint image. Features are then extracted 512 from the single electronic fingerprint image or from the overlapping electronic fingerprint images, these features are then compared 514 to features associated with one or more users in a feature library 630 of features comprising features associated with one or more fingers of one or more authorized users in memory system 610, a successful comparison verifies identity of a user to whom finger 226 belongs.

Cost Reduced Sensor with Outwardly Angled Viewing

Figure 7:
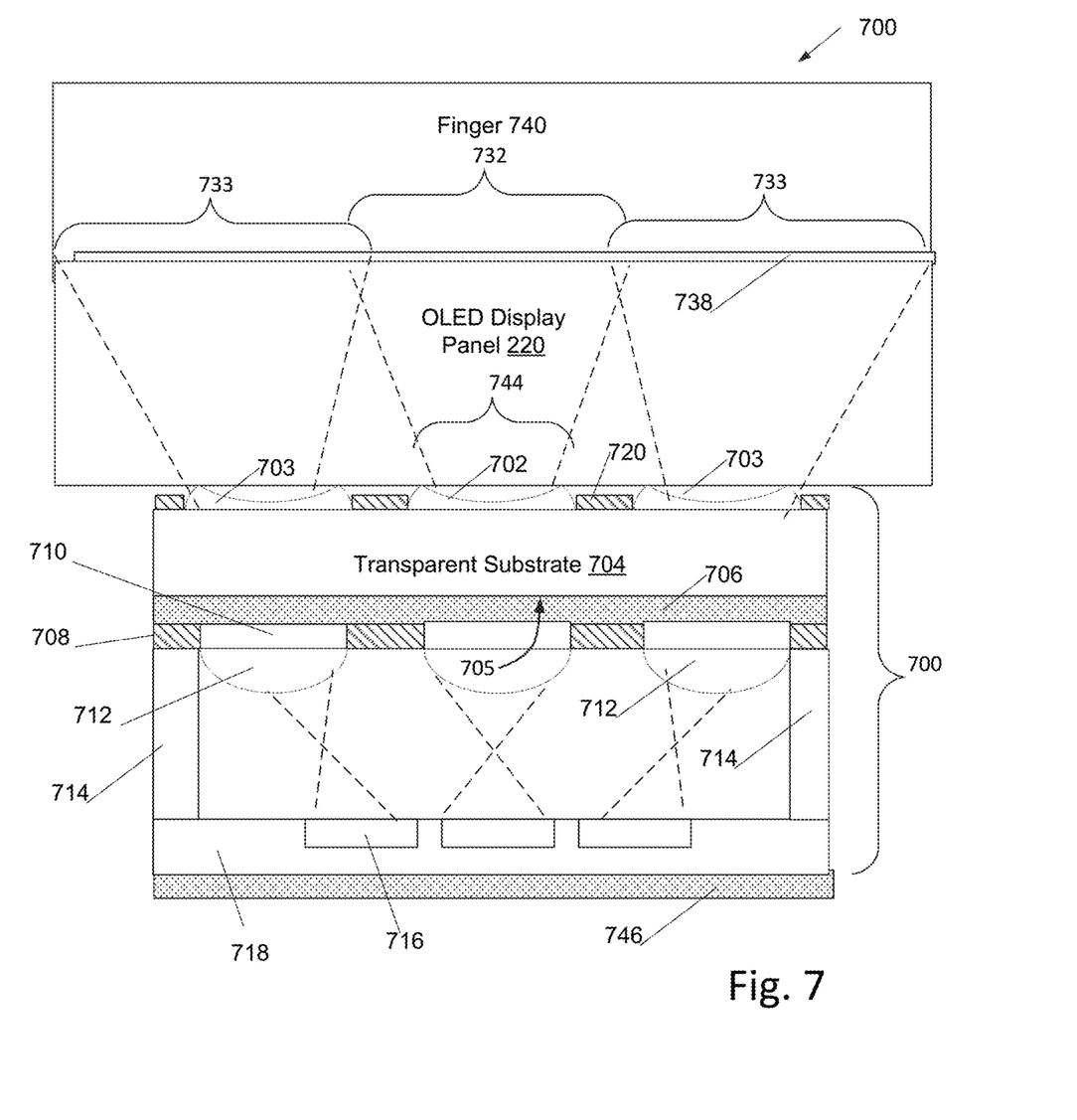
FIG. 7 is a cross-sectional diagram of a cost-reduced optical fingerprint sensor using outwardly-angled imaging through off-axis microlenses at edges of the array of microlenses to image fingerprint area like that of the fingerprint sensor of FIGS. 2-3 while using a smaller integrated circuit than the fingerprint sensor of FIGS. 2-3.

The fingerprint sensor of FIG. 2-3 requires the photosensor-array or image-sensor integrated circuit 108 have a surface area nearly as large as the fingerprint region 228. Since integrated circuit processing costs are proportional to integrated circuit area, and yields are inversely proportional to integrated circuit area, a cost reduction can be achieved if surface area of the integrated circuit can be reduced. FIG. 7 is a cross-sectional diagram of a optical fingerprint sensor 700 using outwardly-angled imaging through off-axis microlenses to image fingerprint area like that of the fingerprint sensor of FIG. 2 and FIG. 3 while using an integrated circuit having smaller surface area than would be required with the on-axis imaging described with reference to FIGS. 2 and 3.

To give a wider angle of imaging than in the embodiment of FIGS. 2-3, each microlens of optical fingerprint sensor 700 has a first, concave, microlens element 702, 703 on a top surface of a transparent substrate 704. In some embodiments, a bottom surface 705 of the transparent substrate 704 has an infrared filter 706, in other embodiments infrared filter 706 is omitted. On the bottom surface 705 of the transparent substrate 704, or the infrared filter 706 if present, is a masked light-absorbing layer 708 with openings 710 to permit imaging. Positioned behind the openings 710 are convex microlens elements 712. Concave lens elements 702, 703 and convex lens elements 712 act together as a two-surface composite microlenses. Spacers 714 are provided to allow a small space of a focal length of the composite microlens formed by concave elements 702, 703 and convex elements 712, the small focal length space between convex lens elements 712 and photosensor arrays 716 of an integrated circuit 718. The small focal length space provided by the spacers 714 permit the microlens to focus light onto the photosensor arrays 716. In some, but not all, embodiments an additional light-absorbing mask 720 may be provided between and around, but not on, the concave elements 702, 703.

In a particular embodiment, concave lens elements 702, 703 and convex lens elements 712 are less than or equal to 1 millimeter (mm) in diameter, spacers 714 allow a 0.5 mm to 1.0 mm space between convex elements 712 and photosensor arrays 716, and thickness of the transparent substrate 704 is less than or equal to 0. 2 mm, thickness of lens is 0.424 mm, and effective focal length EFFL is 0.56 mm. In this embodiment, R1, a radius of the $1^{st}$ concave surface, divided by R2, a radius of the $2^{nd}$ convex surface, is greater than 15, with R2 being less than 0.5 mm and the lens thickness between the optical surfaces meets 0.4<lens Thickness (between two optical surfaces)/EFFL<0.9.

While microlenses in a center portion of the array, such as the microlens incorporating concave element 702 image a portion 732 of a fingerprint region 738 centered over the lens, microlenses at edges of the array, such as the microlenses incorporating concave elements 703, image portions of the fingerprint region 738 offset in a direction away from a center of the array, these microlenses perform off-axis imaging of the fingerprint region. As with the embodiments of FIGS. 2 and 3, the images from adjacent microlenses overlap and may be stitched to form an image of the fingerprint region 738 of a finger 740.

The microlenses are organized in a 1×1, 1×2, 2×2, 2×3, 3×3, or larger array.

Figure 8:
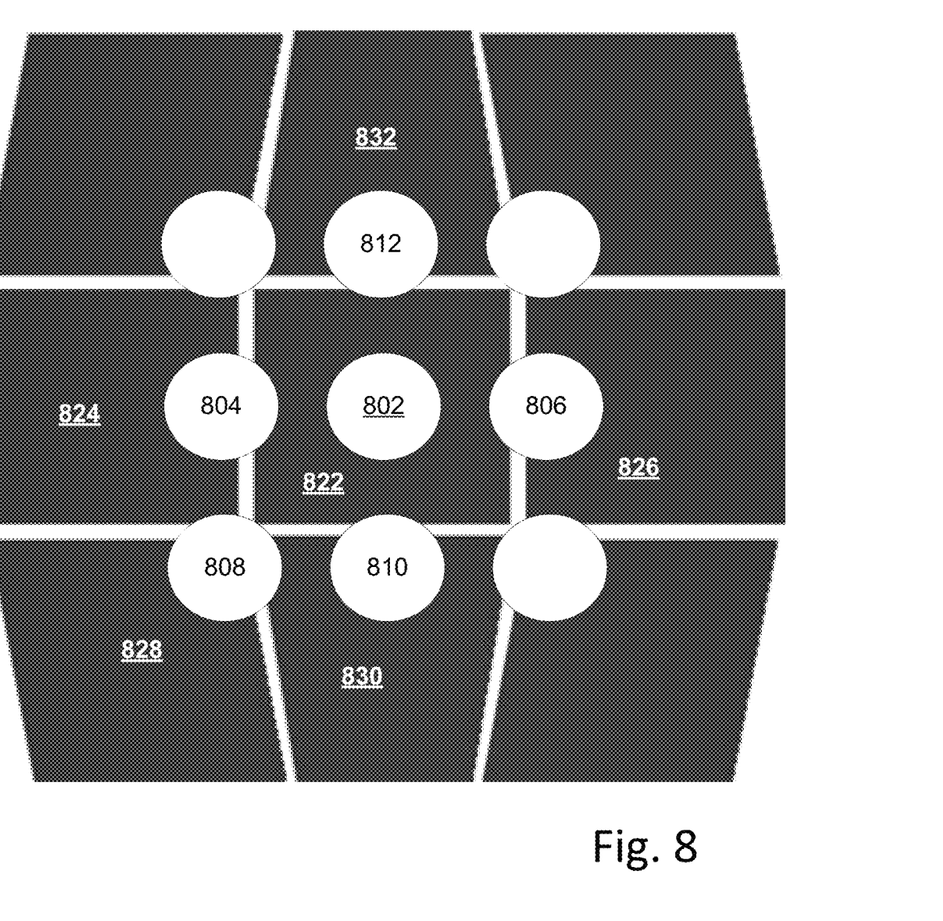
FIG. 8 is an illustration of a 3 by 3 array of microlenses with an approximation of fingerprint area imaged by each.

While microlenses in a center portion of an array, such as microlenses 802, (FIG. 8), image region 822 of a fingerprint region 838 centered over the microlens 802, microlenses at edges of the array, such as microlens 804, 806, 808, 810, 812, image portions 824, 826, 828, 830, 832 of the fingerprint region 838 offset away from the center of the array.

Figure 9:
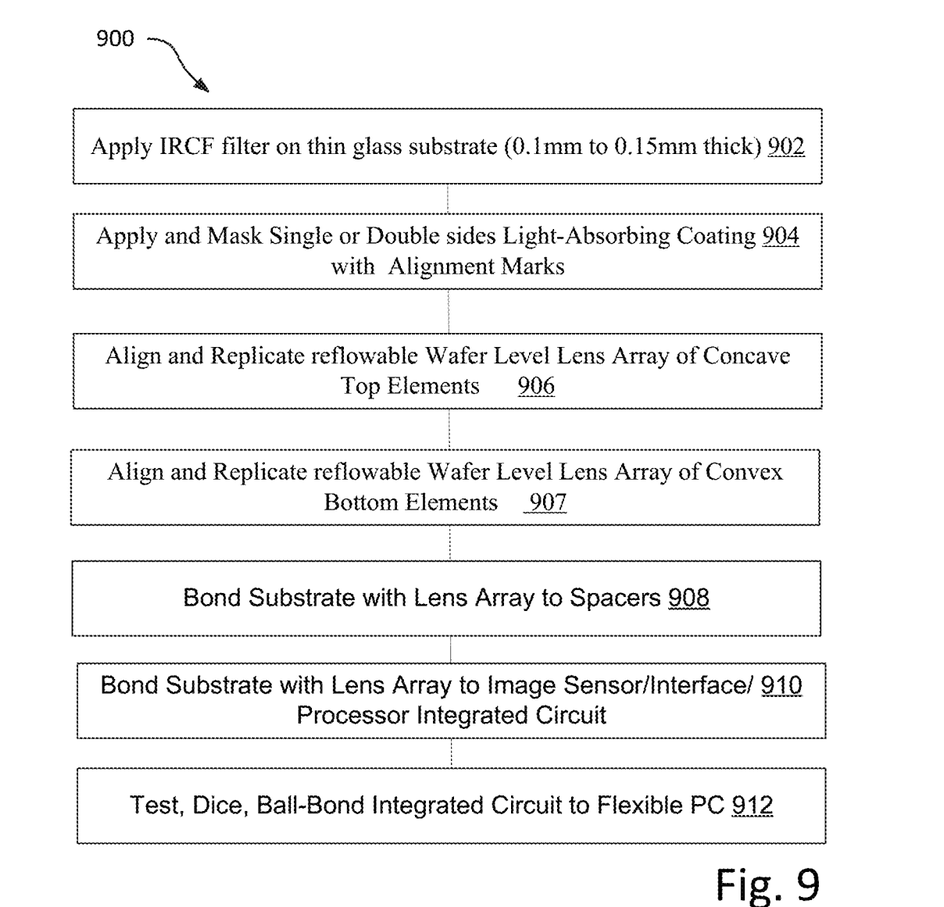
FIG. 9 is a flowchart illustrating a method for how the optical fingerprint sensor is produced.

The optical fingerprint sensor 700 is produced by a process 900 according to FIG. 9. The infrared filter 706 is deposited 902 on a bottom side of a thin glass substrate 704. Black light-absorbing coatings, or masks, 708 are deposited 904, masked, and etched on the bottom side of the glass substrate 704, if the infrared filter 706 is present the masked light-absorbing coating 708 is deposited over the infrared filter 706. In some embodiments black additional light-absorbing coatings, or masks 720 are also deposited on a top side of the glass substrate 704. The bottom black light absorbing coating 708, and additional light-absorbing coating 720 if used, are masked and etched to form openings 710, 744 and alignment marks (not shown), these light absorbing coatings form baffles that improve image quality by absorbing stray light and are particularly important when microlenses are formed with small pitch and large image overlap areas.

The microlenses are formed 906, 907 as a wafer level lens array by reflowing reflowable optical material onto a top side of the glass substrate 704 with the reflowable optical material shaped with a preformed stamp to form concave microelements 702, 703. Reflowable optical material is also applied to the bottom side of glass substrate 704 and shaped with another preformed stamp to form convex microlens elements 712. The alignment marks are used to align the stamps and optical material with the previously formed openings 710, 744 in the light absorbing coatings. The bottom side of the glass substrate 704 is then aligned, and bonded 908, to spacers 714, and the assembled glass substrate 704 with microlens elements and spacers is then aligned and bonded 910 to a wafer of integrated circuits 818. The assembled wafer with microlens elements, glass substrate, spacer, and integrated circuits may be tested and defective circuits inked. The assembled wafer is then diced, typically by sawing, and individual integrated circuits bonded 912 using a ball-bond reflow technique to flexible printed circuit 746.

Figure 10A:
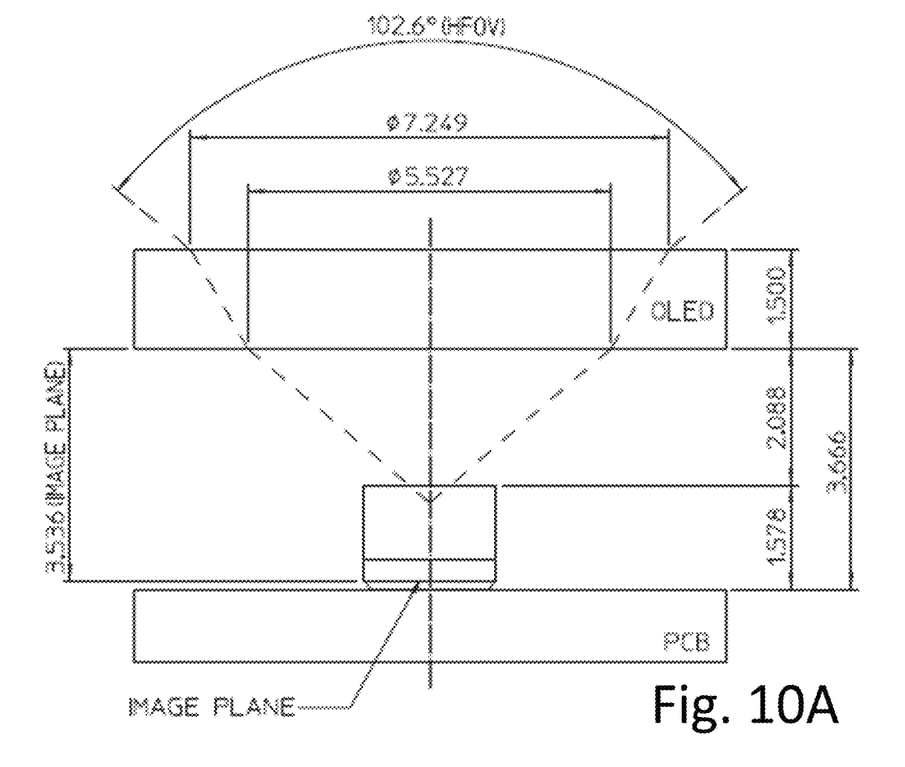
FIG. 10A is a side view cross section of an optical path from fingerprint through a microlens to image sensor in an embodiment. Dimensions shown are in tenths of a millimeter (mm).
Figure 10B:
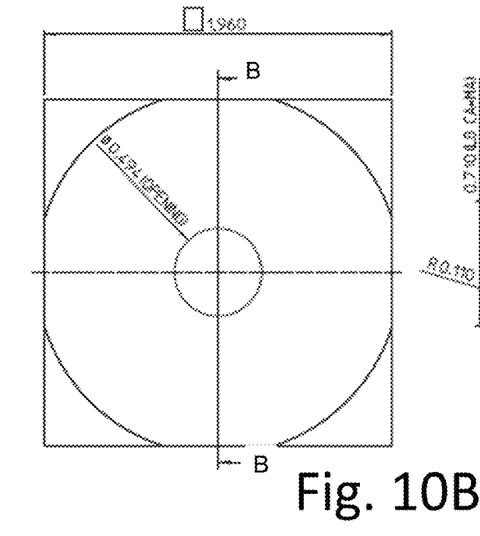
FIG. 10B is a top plan view of a microlens that may produce the optical path of FIG. 10A, the inner circle representing an outer edge of the concave portion of a lower lens surface and the outer circle representing an outer edge of an integral spacer formed. as a conical cavity within which a convex upper lens surface is formed
Figure 10C:
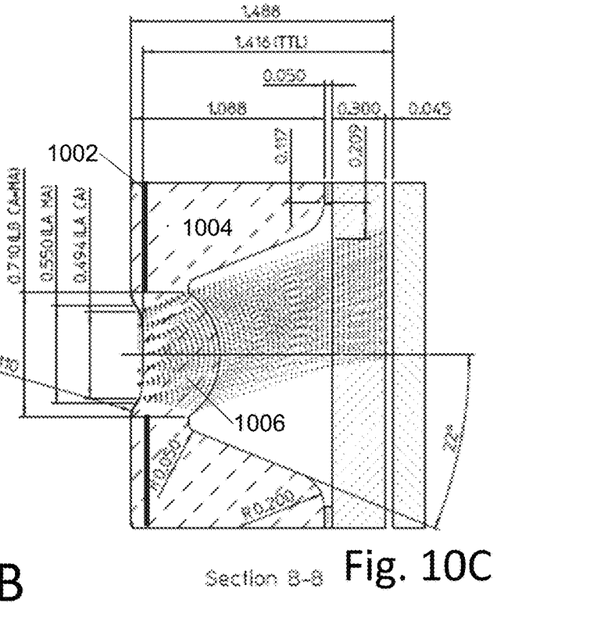
FIG. 10C is a cross sectional view of a microlens of FIG. 10B, showing the lens and integrated spacer.

In a particular embodiment illustrated with side view cross section in FIG. 10A has an optical path from fingerprint through a microlens of 0.05 mm diameter formed in a conical cavity of a lens plate of 1.088 mm thickness and configured to form images of a field of view extending 102.6 degrees horizontally from an axis of the lens. The microlens is illustrated in top plan view in FIG. 10B with the inner circle representing an outer edge of the concave portion of a lower lens surface and the outer circle representing an outer edge of an integral spacer formed as a conical cavity within which a convex upper lens surface of the lens is formed. The lens is shown in cross section in FIG. 10B, showing the lens 1006, a black mask 1002 that reduces stray light that might otherwise reach photodiodes of the image sensor array, and the integrated spacer 1004.

Figure 11A:
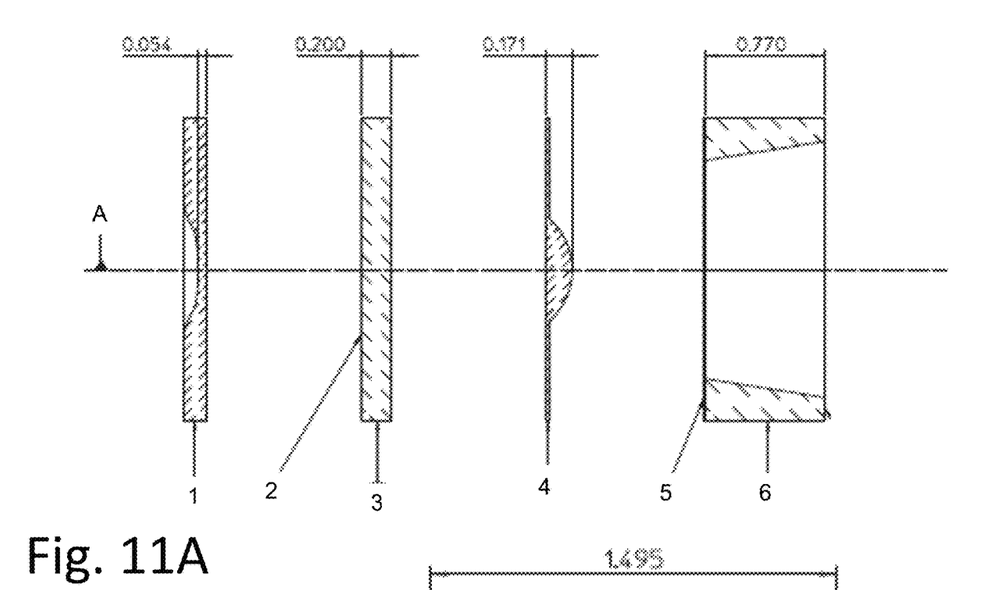
FIG. 11A illustrates individual layers of an alternative microlens.
Figure 11B:
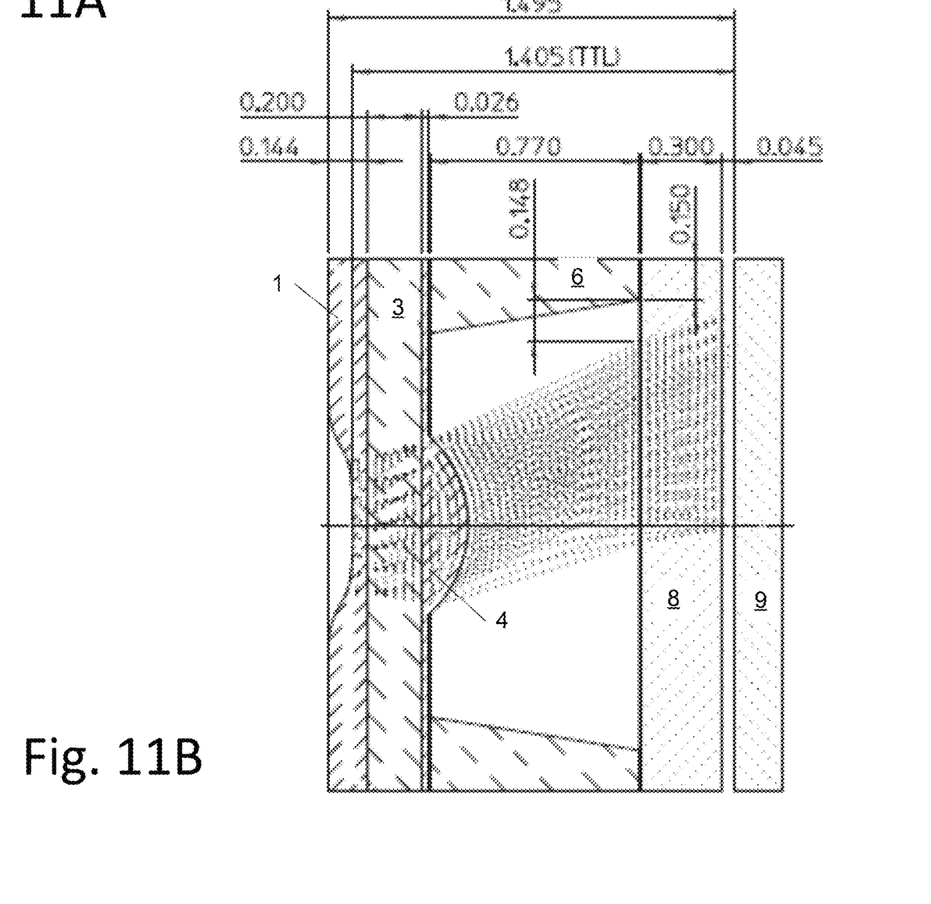
FIG. 11B is a cross sectional illustration of the microlens of FIG. 11A with the individual layers assembled and with ray tracings through the microlens.

In a different particular embodiment, the microlens is formed of six layers, as illustrated in FIG. 11A where each layer is shown separately. A black absorptive coating 2 is applied to a first surface of a thin substrate glass wafer 3 that is 0.2 mm thick, this coating is masked to remove 0.5 mm diameter central portions of the coating thereby forming apertures through which light may reach a photosensor array after passing through each lens formed on the glass wafer 3. A layer bearing concave lens A structures 1 approximately 0.144 mm deep is then replicated on a first surface of the coated wafer, typically by deposition and molding of reflowable lens material. A layer bearing convex lens B structures 4 that are 0.171 mm tall is replicated on a second surface of the coated wafer, typically by depositing and molding. A layer of glue 5 and a molded spacer 6 that is 0.77 mm tall, 1.96 mm square, and coaxial with an axis. The lens and spacer are then assembled to an OLED panel 8 through which a fingertip bearing a fingerprint 9 is viewed.

Combinations

The features here described can be combined in several ways. Among combinations of these features anticipated by the inventors are:

A multiple-lens optical fingerprint reader designated A adaptable to read fingerprints through a display includes an image sensor integrated circuit with at least one photosensor array; a spacer; and multiple microlenses organized in a microlens array, each microlens of the microlenses configured to focus light arriving at that microlens from a portion of a fingerprint region of a finger adjacent a surface of the display to form an image on a plurality of photosensors associated with that microlens, the photosensors being of a photosensor array of at least one photosensor array in the image sensor integrated circuit. The microlenses each include a concave element on a first side of a transparent substrate and a convex element on a second side of the transparent substrate A fingerprint reader designated AA including the fingerprint reader designated A has, for microlenses adjacent an edge of the microlens array, the portion of the fingerprint region from which light is focused onto the plurality of photosensors by each microlens offset in a direction away from a center of the microlens array from the image formed on the plurality of photosensors associated with that microlens.

A fingerprint reader designated AB including the fingerprint reader designated A or AA further including at least one light absorbing masking layer having openings associated with each microlens of the microlens array.

A fingerprint reader designated AC including the fingerprint reader designated A, AA, or AB wherein the microlens array includes at least a 1×2 array of microlenses.

A fingerprint reader designated AD including the fingerprint reader designated AC wherein the microlens array comprises at least a 3 by 3 array of microlenses.

A fingerprint reader designated AE including the fingerprint reader of designated A, AA, AB, AC, or AD further including an infrared filter.

A method of verifying identity of a user designated B includes illuminating a fingerprint region of a finger of the user with an organic light emitting diode (OLED) display panel; focusing light from the fingerprint region through an array of microlenses onto at least one photosensor array of an integrated circuit, each microlens focusing light from a portion of the fingerprint region onto multiple photosensors of the at least one photosensor arrays; reading the at least one photosensor array to form overlapping electronic fingerprint images; extracting features by a method selected from extracting features from the overlapping electronic fingerprint images and extracting features from a stitched image formed from the overlapping electronic fingerprint images; and comparing the features to features of at least one user in a library of features associated with one or more fingers of one or more authorized users in a memory. The microlenses each include a concave element on a first side of a transparent substrate and a convex element on a second side of the transparent substrate.

A method of verifying identity designated BA including the method designated B where the microlenses of the microlens array and photosensor arrays of the integrated circuit are configured so the portion of the fingerprint region from which light is focused onto the plurality of photosensors by each microlens at edges of the microlens array is offset in a direction away from a center of the microlens array.

A method of verifying identity designated BB including the method designated B or BA further including at least one light absorbing masking layer having openings associated with each microlens of the array of microlenses.

A method of verifying identity designated BC including the method designated B, BB, or BA wherein the array of microlenses has at least a 1 by 2 array of microlenses.

A method of verifying identity designated BD including the method designated BC wherein the array of microlenses has at least a 3 by 3 array of microlenses.

A method of making a fingerprint reader designated C includes forming an infrared filter on a bottom side of a thin glass substrate; depositing a light-absorbing coating on the infrared filter; masking and etching the light-absorbing coating to form openings; forming an array of concave microlens elements on the thin glass substrate by reflowing reflowable optical material onto a top side of the thin glass substrate and shaping the reflowable optical material with a first preformed wafer-sized stamp; forming an array of convex microlens elements on the thin glass substrate by reflowing reflowable optical material onto a bottom side of the thin glass substrate and shaping the reflowable material with a second preformed wafer-sized stamp; aligning, and bonding the thin glass substrate to a spacer to form a microlens panel; aligning and bonding the microlens panel to a wafer of integrated circuits, each of the integrated circuits having at least one array of photosensors; dicing the wafer of integrated circuits; and bonding the integrated circuits to a flexible printed circuit.

A method designated CA including the method designated C wherein the array of microlenses and at least one array of photosensors are configured such that a portion of the fingerprint region from which light is focused onto the plurality of photosensors by each microlens at an edge of the microlens array is offset in a direction away from a center of the microlens array.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method of verifying identity of a user comprising:
   illuminating a fingerprint region of a finger of the user with an organic light emitting diode (OLED) display panel;
   focusing light received through the OLED display panel from the fingerprint region through an array of microlenses onto at least one photosensor array of an integrated circuit, each microlens focusing light from a portion of the fingerprint region onto multiple photosensors of the at least one photosensor array;
   reading the at least one photosensor array to form overlapping electronic fingerprint images;
   extracting features by a method selected from extracting features from the overlapping electronic fingerprint images and extracting features from a stitched image formed from the overlapping electronic fingerprint images; and
   comparing the features to features of at least one user in a library of features associated with one or more fingers of one or more authorized users in a memory;
   where the microlenses each comprise a concave element on a first side of a transparent substrate and a convex element on a second side of the transparent substrate;
   where a ratio of total optical track length divided by an effective focal length of each microlens is between 0.5 and 2.1.

2. The method of claim 1 wherein the microlenses of the microlens array and photosensor arrays of the integrated circuit are configured such that, for at least a portion of the microlens array, the portion of the fingerprint region from which light is focused onto the plurality of photosensors by each microlens at an edge of the microlens array is offset in a direction away from a center of the image formed on the plurality of photosensors associated with that microlens.

3. The method of claim 2 further comprising providing at least one light absorbing masking layer having openings associated with each microlens of the array of microlenses.

4. The method of claim 2 wherein the array of microlenses comprises at least a 1 by 2 array of microlenses.

5. The method of claim 4 wherein the array of microlenses comprises at least a 3 by 3 array of microlenses.

6. The method of claim 5 wherein a ratio of a radius of curvature of a concave surface of the concave lens surface element to a radius of curvature of the convex microlens surface is greater than 10.

7. The method of claim 6, wherein the radius of curvature of a convex surface of the convex microlens is less than 0.5 millimeter and lens thickness measured between the concave microlens surface and the convex microlens surface divided by an effective focal length of the microlens is between 0.4 and 0.9.

8. The method of claim 7 where a ratio of a radius of curvature of the convex lens surface divided by an effective focal length of each microlens is between 0.44 and 0.61.

9. The method of claim 5 where each microlens has a field of view of at least 102.6 degrees.

10. The method of claim 5 where the features are extracted from a stitched image formed from the overlapping electronic fingerprint images.

11. The method of claim 5 where the at least one photosensor array comprises a separate photosensor array associated with each microlens.

* * * * *